US006757644B1

(12) United States Patent
Murayama

(10) Patent No.: US 6,757,644 B1
(45) Date of Patent: Jun. 29, 2004

(54) IMAGE DISPLAYING METHOD, DEVICE, AND COMPUTER-READABLE STORAGE MEDIUM

(75) Inventor: Yoshitaka Murayama, Tokyo (JP)

(73) Assignee: Konami Co., Ltd., Hyogo-ken (JP)

(*) Notice: Subject to any disclaimer, the term of this patent is extended or adjusted under 35 U.S.C. 154(b) by 0 days.

(21) Appl. No.: 09/461,759

(22) Filed: Dec. 16, 1999

(30) Foreign Application Priority Data

Dec. 16, 1998 (JP) .......................................... 10-357102

(51) Int. Cl.⁷ ............................ G06G 7/48; G06G 7/50
(52) U.S. Cl. .............................................. 703/6; 703/9
(58) Field of Search .............................. 345/473; 703/9, 703/6

(56) References Cited

U.S. PATENT DOCUMENTS 5,790,123 A * 8/1998 Wald et al. ................. 713/185
6,147,674 A * 11/2000 Rosenberg et al. ......... 345/157
6,326,964 B1 * 12/2001 Snyder et al. .............. 345/419

OTHER PUBLICATIONS

Post: "Fluid Flow Visualization"; pp. 1–37 (published as pp. 1–40 in Focus on Scientific Visualization); 1993.*
Chaddha, N., "Model–based motion compensated compression for synthetic animations," Proceedings of the 1996 Data Compression Conference, DCC '96. p.: 427.*

N. Chiba, et al., "Two–Dimensional Visual Simulation of Flames, Smoke and the Spread of Fire", The Journal of Visualization and Computer Animation, vol. 5, 1994, pp. 37–53.
C.H. Perry, et al., "Synthesizing Flames and their Spreading", M.I.T, Media Laboratory Perceptual Computing Section Technical Report No. 287; Appears In: Proc. Of the Fifth Eurographics Workshop on Anim. And Sim., Oslo, Norway, Sep. 1994.
J. Stam, et al., "Depicting Fire and Other Gaseous Phenomena Using Diffusion Processes", Proc. Of Siggraph, Aug. 1995, pp. 129–136.
Takahashi J–Y, et al., "Image Synthesis of Flickering Scenes Including Simulated Flames", Ieice Transactions on Information and Systems, Institute of Electronics Information and Comm. Eng. Tokyo, JP, vol., E80–D, No. 11, Nov. 1, 1997, pp. 1102–1107.

* cited by examiner

Primary Examiner—Hugh Jones
(74) Attorney, Agent, or Firm—Sughrue Mion, PLLC

(57) ABSTRACT

In an image display method used in a game device to display a fluid which is virtually caused along a three-dimensional surface, the three-dimensional surface is mapped onto a flat plane on which a flow of the fluid is calculated to obtain calculation results. The calculation results are remapped onto the three-dimensional surface. A flame is moved along the three-dimensional surface together with the flow of the fluid and flame colors are also changed in consideration of a density of the fluid.

11 Claims, 12 Drawing Sheets

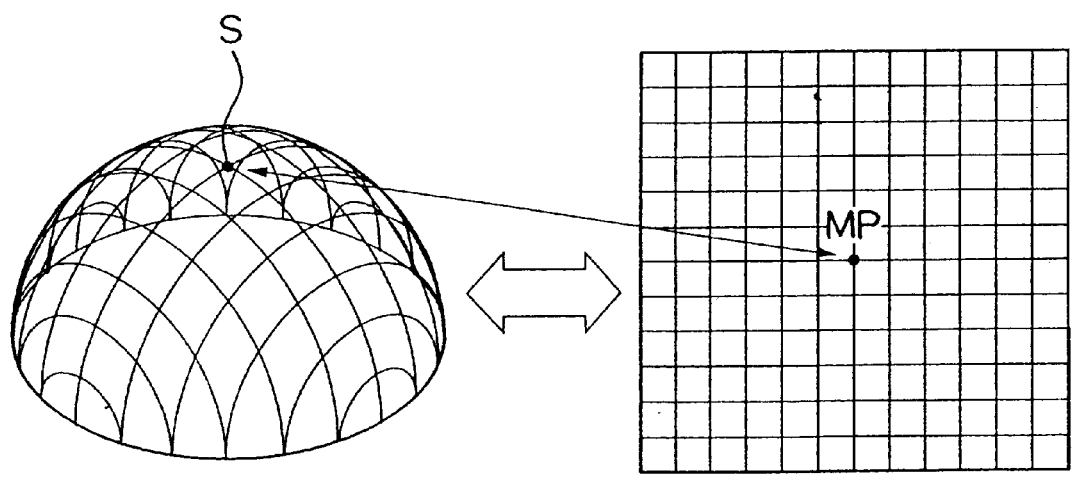
FIG. 2A                    FIG. 2B

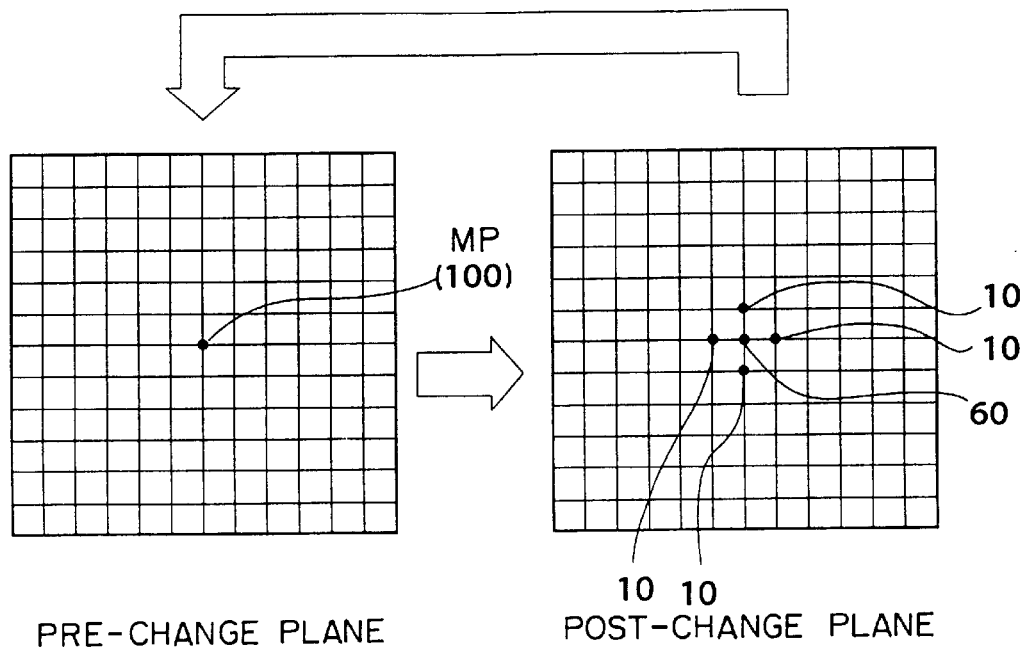
FIG. 3A
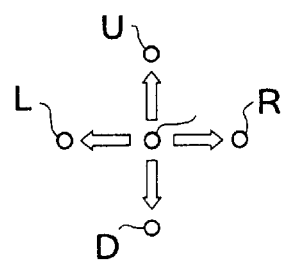
FIG. 3B
| POSI-TION | DENSITY RATIO(%) |
|---|---|
| U | 10 |
| D | 10 |
| R | 10 |
| L | 10 |
| P | 60 |
FIG. 3C

IMAGE DISPLAYING METHOD, DEVICE, AND COMPUTER-READABLE STORAGE MEDIUM

BACKGROUND OF THE INVENTION

This invention relates to an image display method and device for use in a game device or the like and, in particular, to the image display method which is appropriate for effectively and simply displaying a fluid flowing on a three-dimensional surface to obtain a sufficient visual effect. In addition, this invention relates to a computer-readable storage-medium for storing a program for simply displaying a fluid image.

Conventionally, a wide variety of computer games or video games, such a simulation game, a role playing game, a battle game, a puzzle game, and the like have been proposed and become popular in the world. It is a recent trend that the user's demands or requests for the computer games have been also diversified and varied at every one of the computer games. One of the demands is to display, on a display device, a moving image with reality and to provide a visual effect such that the users would really be present in a game space. For example, it often happens in a certain computer game that displays must be made on the display device about a flame which appears at a predetermined position on a three-dimensional surface and which is spread from the predetermined position along the three-dimensional surface.

In order to display such a flame, a conventional computer game device usually prepares a plurality of bit map images of flames and switches them from one to another to seemingly display or express a flickering flame. In other words, an animation technique is used to display the flickering flame. However, the flickering flame due to the animation technique lacks reality of the displayed image as well as a variation of the flame.

Herein, it is to be noted here that a flame which spreads along a surface can be concerned with spread of an inflammable fluid and can be simulated by a flow or spread of the inflammable fluid. Taking this into consideration, a flame image with reality may be accomplished by hypothetically causing an inflammable fluid or fuel gas to flow on a predetermined curved surface or three-dimensional surface and by burning the inflammable fuel gas. In this event, the flame image might be required such that the flame which results from combustion of the fuel gas must be dynamically moved to cover a whole or a part of the three-dimensional surface, as the flow of the fuel gas spreads. It may be considered that a more efficient visual effect of a moving flame image can be achieved when flame size and color can be changed in response to a variation of a density of the fuel gas.

Otherwise, consideration may be made about replicating or simulating an actual phenomenon and event with a high fidelity by using a computer graphics technique or the like.

However, it is practically difficult to apply the computer graphics technique to a computer game device restricted in a memory capacity. In addition, the three-dimensional surface is located in a virtual space of the computer game device and is not practically present within a real space. Therefore, it is very difficult to simulate the moving flame on the three-dimensional surface on the basis of results obtained by observing the actual phenomenon and event.

SUMMARY OF THE INVENTION

It is an object of this invention to provide a method of simply displaying a fluid which is caused to flow along a virtual surface.

It is another object of this invention to provide a method of the type described, which is capable of successively displaying a flame which is moved together with the fluid and which is capable of changing a color of the flame to replicate the flame with a high fidelity.

It is still another object of this invention to provide a computer-readable storage medium which stores a program for displaying a moving flame with a high fidelity by changing the flow of the fluid and the color of the resultant flame.

It is yet another object of this invention to provide an image display device which can display a moving flame with a high fidelity.

According to an aspect of this invention, a method is for use in simply and artificially displaying, on a display device, a fluid flowing on a three-dimensional surface which has a predetermined configuration. The method comprises the steps of mapping a fluid start point defined on the three-dimensional surface onto a predetermined flat surface to decide a provisional start point on the predetermined flat surface, determining an initial fluid density at the provisional start point on the predetermined flat point, deciding a succeeding fluid density after lapse of a unit time at each position which is spaced in each prescribed direction from the provisional start point by a unit distance, so that the succeeding fluid density at each position is deceased in comparison with the initial fluid density at the provisional start point, successively calculating a next following fluid density at the provisional start point and each position each time when a next unit time lapses, re-mapping each of the succeeding and the next following fluid densities of the predetermined flat surface onto the three-dimensional surface as re-mapped results, and successively displaying the re-mapped results on the display device. In this event, each of the densities is concerned with a color of a flame to be displayed on the display device.

According to another aspect of this invention, an image display device is for use in displaying, on a display device, an image such that a fluid flows on a three-dimensional surface of a predetermined configuration. The device comprises mapping means for mapping a fluid start point defined on the three-dimensional surface onto a predetermined flat surface to decide a provisional start point on the predetermined flat surface, density calculating means for calculating an initial fluid density at the provisional start point on the predetermined flat point, together with a succeeding fluid density after lapse of a unit time at each position which is spaced in each prescribed direction from the provisional start point by a unit distance, decreasing means for decreasing the succeeding fluid density at each position and the provisional start point each time when a unit time lapses, re-mapping means for re-mapping each of the densities on the predetermined flat surface onto the three-dimensional surface as re-mapped results, and successively displaying means for displaying the re-mapped results on the display device.

According to a further aspect of this invention, a computer-readable storage medium is for storing a program which displays an image of a fluid flowing on a three-dimensional surface of a predetermined configuration. The program comprises the steps of mapping a fluid start point defined on the three-dimensional surface onto a predetermined flat surface to decide a provisional start point on the predetermined flat surface, determining an initial fluid density at the provisional start point on the predetermined flat point, deciding a succeeding fluid density after lapse of a unit time at each position which is spaced in each prescribed direction from the provisional start point by a unit distance, so that the succeeding fluid density at each position is deceased in comparison with the initial fluid density at the provisional start point, successively calculating a next following fluid density at the provisional start point and each position each time when a next unit time lapses, re-mapping each of the succeeding and the next following fluid densities of the predetermined flat surface onto the three-dimensional surface as re-mapped results, and successively displaying the re-mapped results on the display device.

According to another aspect of this invention, a method is for use in displaying, on a display device, a flame which is being spread with an expansion of a fuel. The method comprises the steps of displaying a red flame on a low density zone on which a density of the fuel is low and displaying a flame which includes green and blue in addition to red on a high density zone on which a density of the fuel is high.

BRIEF DESCRIPTION OF THE DRAWING

FIG. 2 shows a mapping process which is used in a method according to a first embodiment of this invention;

FIGS. 3A to 3C show a schematic view for use in describing the method according to the first embodiment of this invention;

DESCRIPTION OF THE PREFERRED EMBODIMENTS

Figure 1:
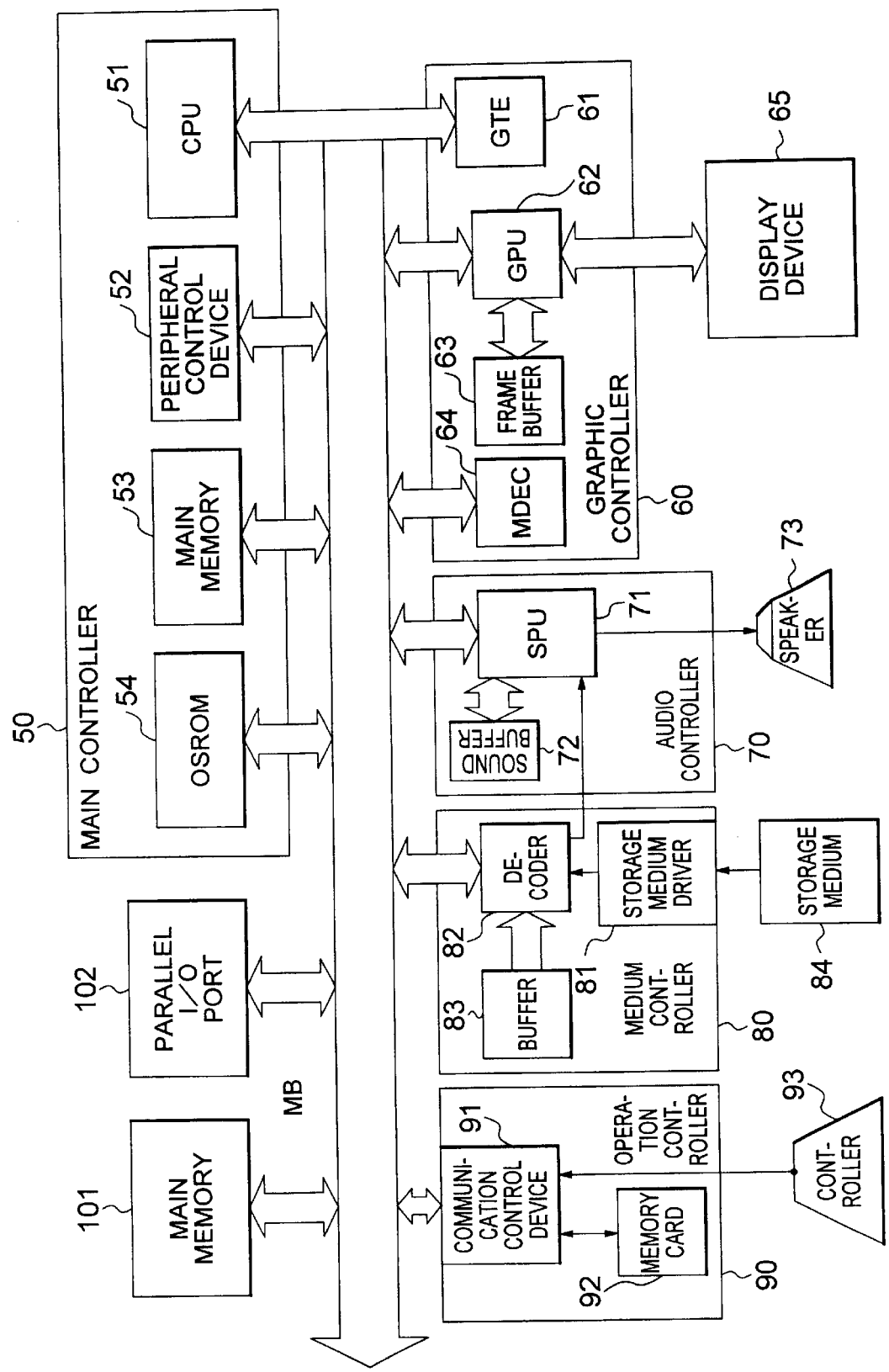
FIG. 1 is a block diagram of a game device to which this invention is applicable.

Referring to FIG. 1, description will be made about an example of a game apparatus to which this invention is applicable. Although a family use game device is exemplified as the game apparatus in FIG. 1, this invention can be applicable to a personal computer device, a graphic computer device, a business use game device, and so on.

Herein, it is to be noted that a program which executes a game according to this invention is stored in a computer readable storage medium (will be simply called a storage medium hereinafter) which may be, for example, an optical disk, such as a CDROM and is read out of the storage medium in response to instructions issued by an operator or a player when the storage medium is loaded in the game apparatus.

As shown in FIG.1, the illustrated game apparatus has a main controller 50, a graphic controller 60, an audio controller 70, a medium controller 80, and an operation controller 90, all of which may be collectively referred to as a control unit. The illustrated control unit, namely, the controllers 50 to 90 are all connected to a main bus MB together with a serial I/O port 101 and a parallel I/O port 102. The illustrated serial I/O port 101 is used to communicate with other game devices and the like while the parallel I/O port 102 is used to be connected to any other peripheral devices. In addition, the main controller 50, the operation controller 90, and the medium controller 80 is operable to execute the game in response to a maneuver of the player and may be called a game controller also.

The illustrated main controller 50 has a central processing unit (CPU) 51, a peripheral device controller 52, a main memory 53, and an operating system (OS) ROM 54. More specifically, the peripheral device controller 52 in the main controller 50 executes interruption control, time control, memory control direct memory access (DMA) transfer control, and so on. On the other hand, the main memory 53 is implemented, for example, by a RAM which has a memory capacity of two megabytes while the OSROM 54 is structured, for example, by an ROM which has a memory capacity of 512 kilobytes. The OSROM 54 is assumed to store an OS which is operable to control the main memory 53, the graphic controller 60, the audio controller 70.

In FIG. 1, the central processing unit (CPU) 51 may be a RISC (Reduced Instruction Set Computer) CPU and controls the remaining elements in accordance with the OS stored in the ROM 54. The illustrated CPU 51 has an instruction cache, a scratch pad memory and also administrates a real memory.

The graphic controller 60 is structured by a geometry transfer engine (GTE) 61, a graphic processing unit (GPU) 62, a frame buffer 63, and an expander (which may be called a motion decoder (MDEC) as will become clear later) 64. The GPU 62 of the graphic controller 60 is connected to a display device 65 which serves as a display controller which controls displayed images of the game.

The display device 65 may be, for example, a television monitor, in the usual family use computer game device or a computer display unit in the personal computer or a work station. In addition, the display device 64 may be a game display apparatus in the business use game device.

In the graphic controller 60, the geometry transfer engine (GTE) 61 is implemented by a co-processor for processing a coordinate conversion or the like while the graphic processing unit (GPU) 62 paints a picture in response to a paint instruction. Such a picture is displayed on the display device 65 in the form of a picture image. The picture image painted by the GPU 62 is stored in the frame buffer 63. In addition, the expander 64 carries out orthogonal transform, such as discrete cosine transform, and decodes a compressed and encoded image data signal into a motion picture. In this connection, the expander 64 may be referred to as the MDEC, as mentioned before.

Furthermore, the geometry transfer engine (GTE) 61 has a parallel calculation circuit for executing a plurality of calculations in parallel. Specifically, the GTE 61 cooperates with the CPU 61 and may be called a co-processor for carrying out coordinate conversion in response to a calculation request sent from the CPU 51. In addition, the GTE 61 can also execute, at a high speed, an inner product between a tangential vector and an optical source vector together with a fixed point calculation related to a matrix and a vector.

The illustrated GTE 61 can carry out calculations of polygons of 150 millions per second to transform the coordinate when a triangle polygon is subjected to flat shading such that the single triangle polygon is painted in the same color. From this fact, it is readily understood that the illustrated GTE 61 is helpful to alleviate a burden imposed on the CPU 51 and can carry out high speed coordinate conversion. Herein, the term "polygon" means a minimum unit of a figure that is displayed as a three-dimensional object and takes a shape of a polygon, such as a triangle, a rectangle, or the like. The illustrated GTE 61 may be operable to execute the coordinate calculations in connection with the polygons, as will become clear as the description proceeds.

The graphic processing unit (GPU) 62 is operable in response to the paint instructions sent from the CPU 51 to paint each polygon. Practically, the illustrated GPU 62 can paint the polygons of 360,000 pieces per second and has two-dimensional address space for mapping a space of the frame buffer 63.

The frame buffer 63 is structured by a dual port RAM and can simultaneously execute write-in operation from the GPU 62 and the main memory 53 and readout operation on displaying. Practically, the frame buffer 63 has a memory capacity of, for example, 1 megabyte and may be specified by a matrix of picture elements of sixteen bits. The picture elements are arranged in rows of 1024 and in columns of 512. In the illustrated example, it is assumed that the frame buffer 63 has a display zone partitioned into a plurality of partial display zones and a non-display zone except the display zone. Each of the partial zones can be individually sent to the display device 65. On the other hand, the non-display zone has a color look-up table (CLUT) area and a texture area. The CLUT area serves to store a CLUT referenced by the GPU 62 on painting each polygon while the texture area serves to store textures or materials mapped into each polygon painted by the GPU 62. Moreover, the illustrated frame buffer 63 can carry out the DMA transfer to the main memory 53.

The MDEC 64 in the graphic controller 60 is operable under control of the CPU 51 to read an image data signal of a static image or a moving image out of the main memory 53 and to decode the image data signal to be stored into the main memory 53 again. Specifically, the MDEC 64 can execute inverse discrete cosine transform (IDCT) at a high speed and also can expand the image data signal which is compressed in accordance with the JPEG and the MPEG techniques and which is read out of the storage medium 84. The resultant image data signal is reproduced and is sent through the GPU 62 to the frame buffer 63. Such a reproduced image can be used as a background image of an image painted by the GPU 62.

The audio controller 70 has a sound processing unit (SPU) 71 for generating a musical sound, an imitation effective sound, or the like on the basis of the instructions sent from the CPU 51, a sound buffer 721 of, for example, 512 kilobytes for storing sound source data, sound data read out of the storage medium 84, and a speaker 73 which generates audible sounds and tones, such as the musical sound, sent from the SPU 71 and which serves as a sound output device.

In the illustrated example, the SPU 71 has a ADPCM function which can reproduce an audio data signal which is subjected to adaptive differential encoding (ADPCM) and which is specified by a differential code of four bits obtained by differentially encoding audio data signals of sixteen bits. In addition, the illustrated SPU 71 is also operable to reproduce the imitation effective sound from the sound source data signals stored in the sound buffer 72 and to reproduce a modulated sound data signal obtained by modulating the sound data signals stored in the sound buffer 72.

More specifically, the illustrated SPU 71 which is operable under control of the CPU 51 has twenty-four ADPCM sound sources automatically variable in accordance with operation parameters determined by coefficients, such as looping, time, and the like. In addition, the SPU 71 has an individual address space obtained by mapping the space of the sound buffer 72 and transfers the ADPCM data signals from the CPU 51 to the sound buffer 72 and reproduces them in accordance with key on/off information and/or modulation information The audio controller 70 which may be also called a sound system has the above-mentioned functions and is collectively used as a sampling sound source for generating the musical sound, the imitation effective sound, on the basis of the audio data signals stored in the sound buffer 72.

Next, the medium controller 80 has a storage medium driver 81, a decoder 82, and a buffer 83. Practically, the storage medium driver 81 is loaded with the storage medium 84, such as the CDROM, a hard disk, an optical disk, a flexible disk, a semiconductor memory, or the like. In the illustrated example, the CDROM is assumed to be used as the storage medium in the illustrated example. In this connection, the storage medium driver 81 may be formed by a CDROM driver and the decoder 82 may be formed by a CDROM driver.

The storage medium driver 81 is operable to reproduce the program, the data signals, and the like stored in the storage medium 84, namely, the CDROM while the decoder 82 is operable to decode the program, the data signals, and the like which include, for example, error correcting codes. The buffer 83 is implemented by an RAM with a memory capacity of, for example, 32 kilobytes and serves to temporarily store reproduced data signals from the storage medium driver 81.

The illustrated example can support a data format of CD-DA, CDROM-XA. The decoder 82 is operable as a part of the audio controller 70 because the audio data signals stored in the storage medium 84 are also reproduced.

The audio data signals stored in the storage medium 84 and reproduced by the storage medium driver 81 may be, for example, the ADPCM data signals (ADPCM data signals in CDROM XA) as mentioned above or PCM data signals obtained by analog-to-digital conversion of the audio signals.

The ADPCM data signals may be represented by differential signals of four bits obtained from the audio digital signals of sixteen bits and are read out of the storage medium 84 to be subjected to error correction and decoding by the decoder 82 and thereafter to be sent to the SPU 71. The SPU 71 carries out the digital-to-analog conversion of the readout audio signals to be supplied to the speaker 73.

On the other hand, when the audio data signals are recorded in the storage medium 84 in the form of the PCM data signals of sixteen bits, the PCM data signals are decoded by the decoder 82 into decoded audio signals to be sent to the speaker 73. At any rate, audio output signals of the decoder 82 is once delivered into the SPU 71 to be mixed with the output signals of the SPU 71 and to be finally sent to the speaker 73.

Further referring to FIG. 1, the operation controller 90 has the communication control device 91 and an additional memory 92, such as a memory card, coupled to the communication control device 91. The communication control device 91 controls communication between a controller 93 and the CPU 51 through the main bus MB. The controller 93 is manipulated by a player to input an instruction from the player. The additional memory 92 is used to memorize the input instructions from the controller 93 and a state of the game.

The illustrated controller 93 serves as an interface which transmits the player's intention to an application or game program. To this end, the controller 93 has, for example, sixteen operation keys of which the states are transmitted about sixty times per second to the communication control device 91 by the use of synchronization communication. The communication control device 91 transmits the states of the operation keys to the CPU 51 through the main bus MB Practically, the illustrated game device has two connectors each of which is connected to the controller 93 and may have a multi-tap terminal which is connected to a multiple number of the controllers 93.

At any rate, the instructions from each player are given to the CPU 51 in response to the manipulation of the player while the CPU 51 carries out processing in accordance with the instructions under control of the game program executed in the game device.

When the game which is being executed is to set or a score of the game is memorized at the end of the game or on the way, data signals in question are transmitted from the CPU 51 to the communication control device 91 and thereafter stored into the additional memory or memory card 92 through the communication control device 91. The memory card 92 is not directly connected to the main bus MB and can be detached from the game device with the power source kept on. Under the circumstances, it is readily understood that the data signals related to the game can be memorized into a plurality of the memory cards 92.

In the illustrated game device, a great amount of image data signals must be transferred at a high speed among the main memory 53, the GPU 62, the MDEC 64, and the decoder 82, when the program is read out of the storage medium 84 and images are displayed or pictures are painted.

For this purpose, the DMA transfer can be carried out in the illustrated game device to directly transfer data signals among the main memory 53, the GPU 62, the MDEC 64, the decoder 82 under control of the peripheral device controller 52. Inasmuch as such DMA transfer is carried out without using the CPU 51, it is possible to alleviate a burden of the CPU 51 and to also accomplish high speed data transfer.

Referring to FIGS. 2A and 2B, description will be made about an image which is displayed by the use of the game device illustrated in FIG. 1 on the display device 65. In this example, a dome shaped semispherical surface is illustrated as a three-dimensional surface. It is assumed that the dome shaped semispherical surface appears as a barrier when a certain character displayed on a screen casts a spell or magic over the other character and the other character is confined within the barrier. The dome shaped semispherical surface has a top S, as illustrated in FIG. 2A, and an inflammable fuel gas is assumed to spout from the top S.

Furthermore, it is also surmised that the inflammable fuel gas which spout from the top S is caused to flow along the dome shaped semispherical surface and is burnt on the dome shaped semispherical surface. As a result, it is possible to realize a visual effect such that the other character surrounded by the barrier is wrapped within the barrier by the flame during the flow of the inflammable fuel gas.

In order to accomplish the visual effect with reality, the present invention calculates a relationship between the spread of the inflammable fuel gas and the spread of the flame together with a relationship between a density of the fuel gas and a color and displays a flame which varies with time on the display device 65 of the game device illustrated in FIG. 1.

Specifically, the dome shaped semispherical surface illustrated in FIG. 2A appears in a game titled "fantasy of Suiko-den (Chinese famous story)" and serves as the barrier surrounding the character. In the practical game mentioned above, displays are made such that the character is confined in the dome shaped semispherical surface and is surrounded by the flame, as will be illustrated later. In the illustrated example, the dome shape semispherical surface is represented by spherical coordinates and is divided into a plurality of zones on the spherical coordinates for brevity of description. However, it is noted that the spherical coordinates are not practically displayed on the screen of the display device 65.

The illustrated dome shaped semispherical surface is semitransparent or translucent so that the character confined in the semispherical surface can be visually seen through the semispherical surface by players or users. Such a semitransparent surface can be readily displayed by using the functions of the game device illustrated in FIG. 1.

As mentioned before, the inflammable fuel gas spouts from the top S and flows along the semispherical surface. Therefore, the top S may be referred to as a flow start point. Taking this into consideration, the inflammable fuel gas has a highest density at the flow start point S and is spread along the semispherical surface towards peripheral portions with time. Herein, it is to be noted that the density of each coordinate position is varied with time and the flame is also spread from the flow start point S with the spread of the inflammable fuel gas, when the inflammable fuel gas is burnt. In this case, the flame size is also changed at each coordinate position with time.

In the embodiment according to this invention, the movement and the size of the flame are determined by a flowing state of the inflammable fuel gas and the color of the flame displayed is changed in dependency upon the density of the inflammable fuel gas flowing at each coordinate position. This is very effective to improve the reality of the flame and to raise up the visual effect of the flame.

In a fluid image display method according to this invention, the dome shaped semispherical surface, namely, a curved surface illustrated in FIG. 2A is mapped on a flat surface which is illustrated in FIG. 2B. As shown in FIG. 2B, the flat surface is approximately represented by an orthogonal coordinate. In other words, the spherical coordinate system illustrated in FIG. 2A are approximated by the orthogonal coordinate system illustrated in FIG. 2B.

According to the inventors' experimental studies, it has been confirmed that a sufficient visual effect can be accomplished by approximating the spherical coordinate system by the orthogonal coordinate system, when the flow of the inflammable fuel gas and the movement of the flame are displayed along the semispherical surface.

More specifically, the flow start point S (FIG. 2A) determined at the top of the dome shaped semispherical surface is mapped at a center point MP of the flat surface illustrated in FIG. 2B. It is assumed that the density or amount of the inflammable fuel gas at the flow start point S and the center point MP is set to 100%.

Referring to FIGS. 3A, 3B, and 3C, description will be made about a variation of the density of the inflammable fuel gas. On the left hand side of FIG. 3A, illustration is made of an anterior state before the fuel gas begins to flow from a provisional or mapped start point MP. On the right hand side of FIG. 3B, illustration is made of a posterior state appears when a predetermined time lapses after the flow of the fuel gas from the provisional start point MP.

As shown in FIG. 3A, the top S of the dome shaped semispherical surface is mapped at the center point MP which may be referred to as the provisional or mapped start point. It is assumed that the inflammable fuel gas is caused to uniformly flow from the center point MP within a unit time by a predetermined distance or length in four directions, namely, upward, downward, leftward, and rightward directions. Thus, the inflammable fuel gas flow is changed from the state illustrated on the left hand side of FIG. 3A to the state illustrated on the right hand side of FIG. 3A. Taking this into consideration, the flat plane or surface on the left hand side of FIG. 3A may be called a pre-change plane while the flat plane on the right hand side of FIG. 3A may be called a post-change plane. As will become clear as the description proceeds, the post-change plane (on the right hand side) at a certain calculation time point is changed to the pre-change plane at a next following time point white the pre-change plane (on the left hand side) at the certain calculation time point is changed to the post-change plane at the next following time point. Thus, similar operation is successively repeated by changing the state of the planes.

In the example illustrated in FIGS. 3B and 3C, it is assumed that the inflammable fuel gas is caused to flow from the center point MP by 10% to an upward position (U) spaced apart from the unit distance from the center point MP while the inflammable fuel gas is caused to flow from the center point MP by 10% to a downward position (D) distant by the unit distance. Likewise, 10% of the inflammable fuel gas is assumed to be caused to flow from the center position MP to each leftward and rightward position L and R spaced by the unit distance. The resultant and remaining inflammable fuel gas at the center position MP is reduced from 100% to 60%. This shows that the amount or the density of the inflammable fuel gas at the center position MP is reduced to 60% from the initial state while the density of each of the upward, the downward, the leftward, and the rightward positions U, D, L, and R is relatively increased from 0% to 10%.

After lapse of a predetermined time, namely, the unit time, similar calculation is executed at each of the center point MP and the four points U, D, L, and R adjacent to the center point MP. More specifically, the inflammable fuel gas of 60% is caused to flow at a rate of 10% from the center point MP to each of the four positions U, D, L, and R while the inflammable fuel gas caused to flow to the four points U, D, L, and R is further caused to flow at a rate of 10% from each of the four points U, D, L, and R to four directions, namely, upward, downward, leftward, and rightward directions.

As a result, the inflammable fuel gas reduced to 60% is caused to flow from the center point MP at the rate of 10% to the four directions. This means that the inflammable fuel gas of 6% is caused to flow from the center point MP to the four directions and the inflammable fuel gas at the center point MP is reduced to 36%. However, the inflammable fuel gas of 10% which flows into each of the four positions U, D, L, and R is returned back to the center point MP at the rate of 10%. This means that the inflammable fuel gas of 1% is sent back to the center point MP from each of the four positions U, D, L, and R. The resultant amount or density of the inflammable fuel gas at the center point MP becomes equal to 40%.

From each of the four positions U, D, L, and R, the inflammable fuel gas is caused to flow to four directions at the rate of 10%. For example, at the leftward position L, the inflammable fuel gas of 10% is caused to flow at the rate of 10% to the four directions and is reduced to 6%. However, the inflammable fuel gas of 6% is caused to flow into the leftward position L from the center point MP. The resultant amount or density of the inflammable fuel gas at the leftward position L becomes equal to 12%. This is true of any other positions U, D, and R.

Similar calculation is also carried out at outer positions located outside of the upward, the downward, the leftward, and the rightward positions U, D, L, and R, because the inflammable fuel gas is spread outside of the four positions U, D, L, and R. Thereafter, the density or amount of the inflammable fuel gas is calculated at each position of the flat plane in a similar manner each time when the unit time lapses. Thus, spread and the density of the inflammable fuel gas can be successively expressed in the above-mentioned manner. When the density of the inflammable fuel gas is calculated at each position on the flat plane at every unit time, the calculated density of the inflammable fuel gas is remapped on the spherical coordinates illustrated in FIG. 2A. Thus, each density of the inflammable fuel gas at each of positions on the three-dimensional surface can be obtained at every unit time.

Figure 4:
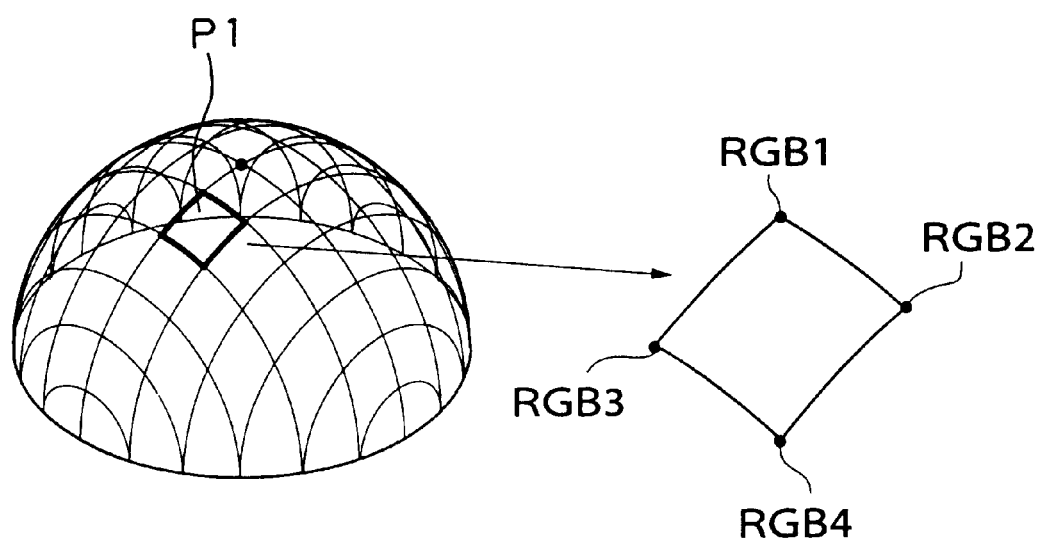
FIG. 4 shows a view for use in describing a process of processing a polygon.

According to the above-mentioned method, it is possible to simplify calculations by mapping the positions of the semispherical surface (the three-dimensional surface) onto the positions of the flat plane or surface to calculate the amount or the density of the gas at every position on the flat plane, and by remapping the calculated results onto the spherical surface. Referring to FIG. 4, the dome shaped semispherical surface has a surface region formed by or divided into a plurality of polygons each of which is located at positions defined by the spherical coordinates illustrated in FIG. 2.

In this event, each polygon can be specified by each apex position thereof. For example, the polygon of a rectangular shape can be specified by indicating four apex positions and can be distinguished from the other polygons.

In the game device illustrated in FIG. 1, it is possible to determine a color of an internal zone defined by four apexes by defining colors (R, G, B) at the four apexes and to make the internal zone opaque, transparent, or semitransparent in accordance with an indication.

In FIG. 4, a single one of the polygons which form the dome shaped semispherical surface on the left hand side of FIG. 4 is enlarged on the right hand side of FIG. 4 and has first through fourth apexes 1 to 4. The illustrated enlarged polygon can be specified by indicating the first through the fourth positions at which apex colors (RGB1), (RGB2), (RGB3), and (RGB4) are also indicated, respectively. The internal zone of the illustrated polygon is painted in color by carrying out interpolation among the apex colors by the use of the Gouraud Shading technique. Herein, it is to be noted that no texture is put on the illustrated polygon so as to make the polygon translucent.

The image display method mentioned above can improve the reality of the visual image due to an excellent visual effect in the game device by using a relationship between the variation of the gas density and the flame colors. Herein, it is to be noted that an actual flame color becomes near to white as the gas density and a flame temperature become high while the actual flame color becomes near to red when the gas density and the flame temperature are reduced. Taking this into consideration, description will be made about the relationship between the gas density and the flame color with reference to FIG. 5.

Figure 5:
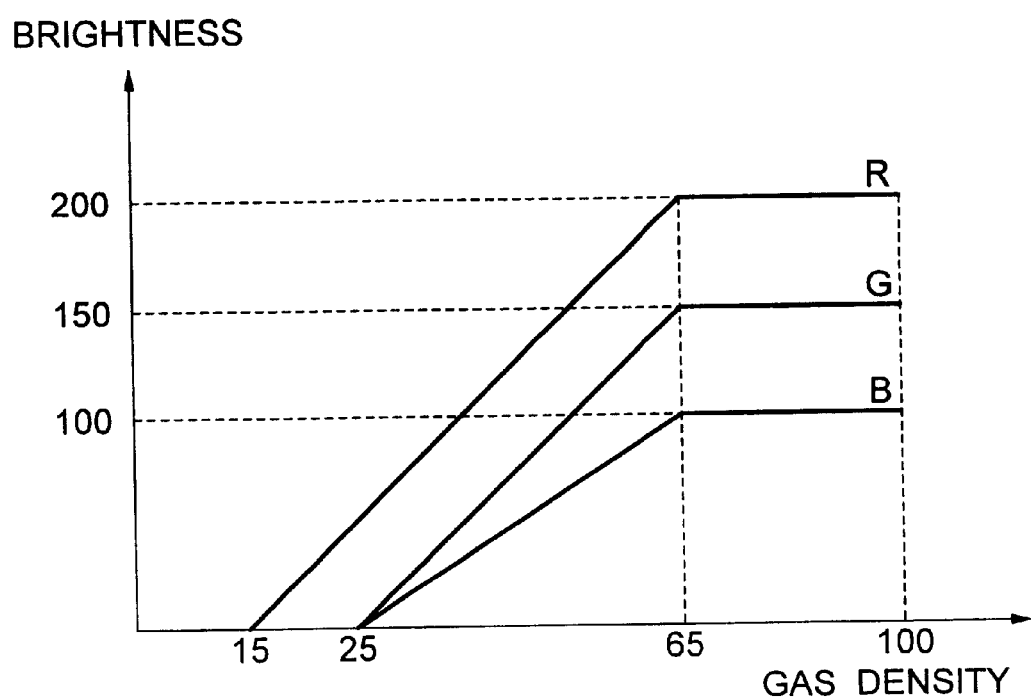
FIG. 5 shows a graphical representation for use in describing a relationship between a gas density and brightness.

In FIG. 5, the gas density and brightness (light and shade) are taken along the abscissa and the ordinate, respectively. The gas density along the abscissa has a maximum density represented by 100 (arbitrary unit) while the illustrated brightness along the ordinate has a maximum brightness determined as 200 (arbitrary unit). As shown in FIG. 5, the flame color is determined only by the red (R) component when the gas density is low and lower than 25 in FIG. 5. In this case, it is readily understood that the red flame is displayed on the display device 65 (FIG. 1). With an increase of the gas density, green (G) and blue (B) components are included in the flame together with the red (R) component. In the example, it is clear from FIG. 5 that the displayed flame includes a large amount of the red (R) component as compared with amounts of the green (G) and the blue (B) components. In addition, when the gas density exceeds 65, the red (R), the green (G), and the blue (B) components are kept at 200, 150, and 100, respectively, and thereafter invariable even when the gas density increases more than 65. This shows that a white flame is displayed on the screen by keeping the red (R), the green (G), and the blue (B) components to 200, 150, and 100, respectively.

Figure 6:
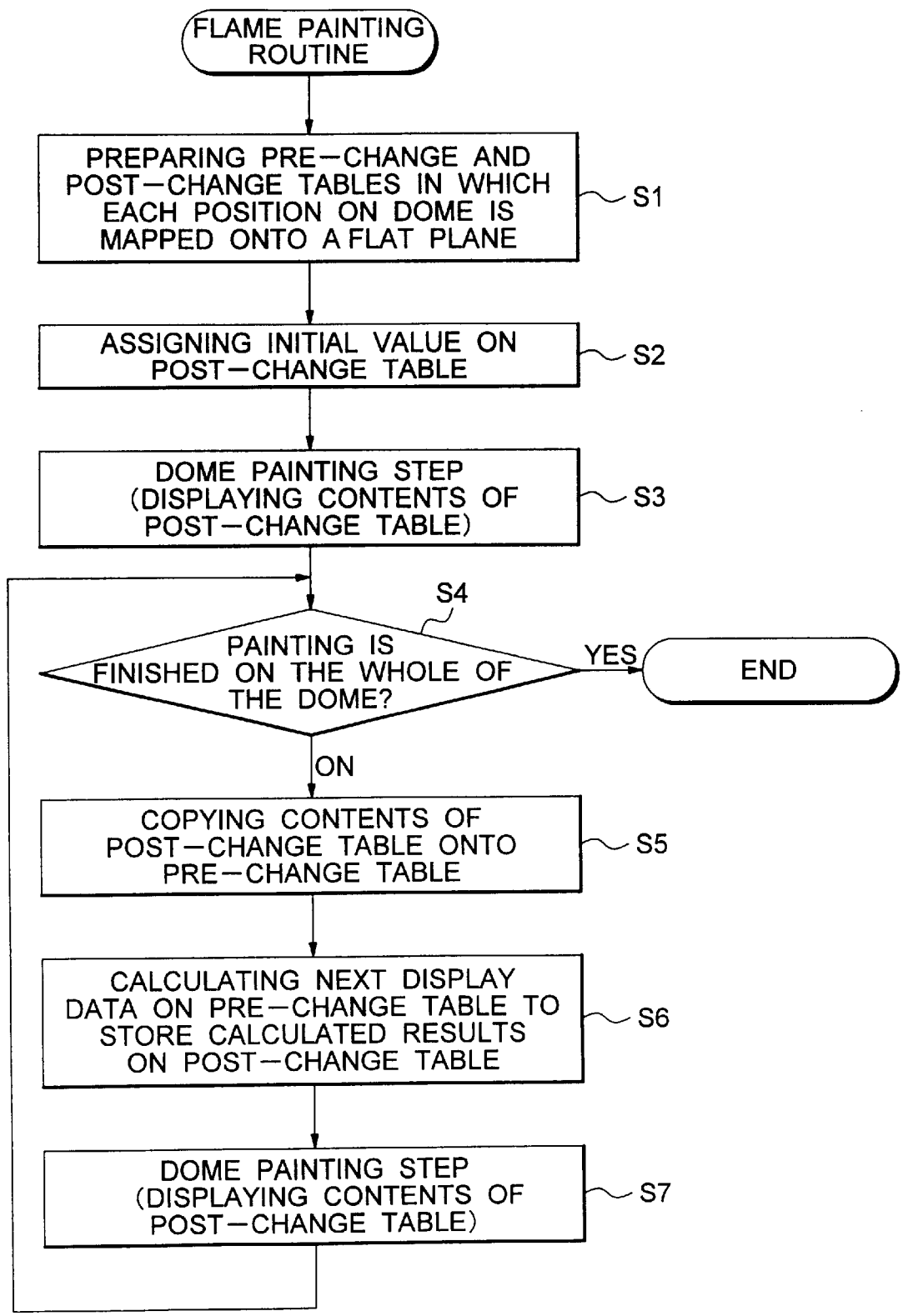
FIG. 6 shows a flow chart for use in describing the method according to this invention.

Referring to FIG. 6 afresh and FIG. 1 again, description will be made about an image displaying method according to a first embodiment of this invention. When an instruction of painting the dome shaped surface is issued from a player by manipulating the controller 93 or in accordance with a predetermined procedure based on the game program stored in the main memory 53, the dome shaped surface as shown in FIG. 2 A is displayed on the display device 64 under control of the CPU 51 and the GPU 62. Under the circumstances, processing is moved to a flame painting routine illustrated in FIG. 6, so as to display a flame as mentioned before in accordance with the gas density.

The flame painting routine illustrated in FIG. 6 may be previously loaded in the main memory 53 or may be transferred from the storage medium 84 to the main memory 53 in accordance with the instruction issued by the player.

Herein, each position on the dome shaped surface is mapped on the flat plane illustrated in FIG. 3A. In the illustrated example, the pre-change plane and the post-change plane are prepared as a pre-change table and a post-change table both of which are stored in the main memory 53 (step S1). In other words, the main memory 53 has a memory area for storing the flat planes on which the semispherical surface is mapped.

At first, the gas density of 100 is assigned or given as an initial value to the center point MP on the post-change table, as shown in FIG. 3A, (step S2). Thereafter, the dome painting step S3 is executed in a manner to be described later to paint the dome by display data (namely, the gas density or the gas amount) calculated on the post-change table. At a step S4, it is judged by the CPU 51 Whether or not the whole of the dome is completely painted. In other words, judgement is made at the step S4 about whether or not painting is finished on the whole of the dome. When the painting is not finished, the step S4 is succeeded by a step S5 at which contents of the post-change table are copied onto the pre-change table as copied contents.

The copied contents on the pre-change table are processed by the CPU 51 to calculate display data at the next following time and to obtain calculated results. The calculated results are stored as next display data in the post-change table of the main memory 51 to be displayed at the next following time (step S6). At a step S7, the next display data is read out of the post-change table and is painted on the dome in the form of a flame in a manner similar to the step S3.

Subsequently, the calculations are successively executed on the whole of the dome in the manner mentioned in conjunction with FIG. 3, by alternately using the pre-change table and the post-change table. When it is judged at the step S4 that displaying is completed about the whole of the dome, the flame painting routine is finished.

Figure 7:
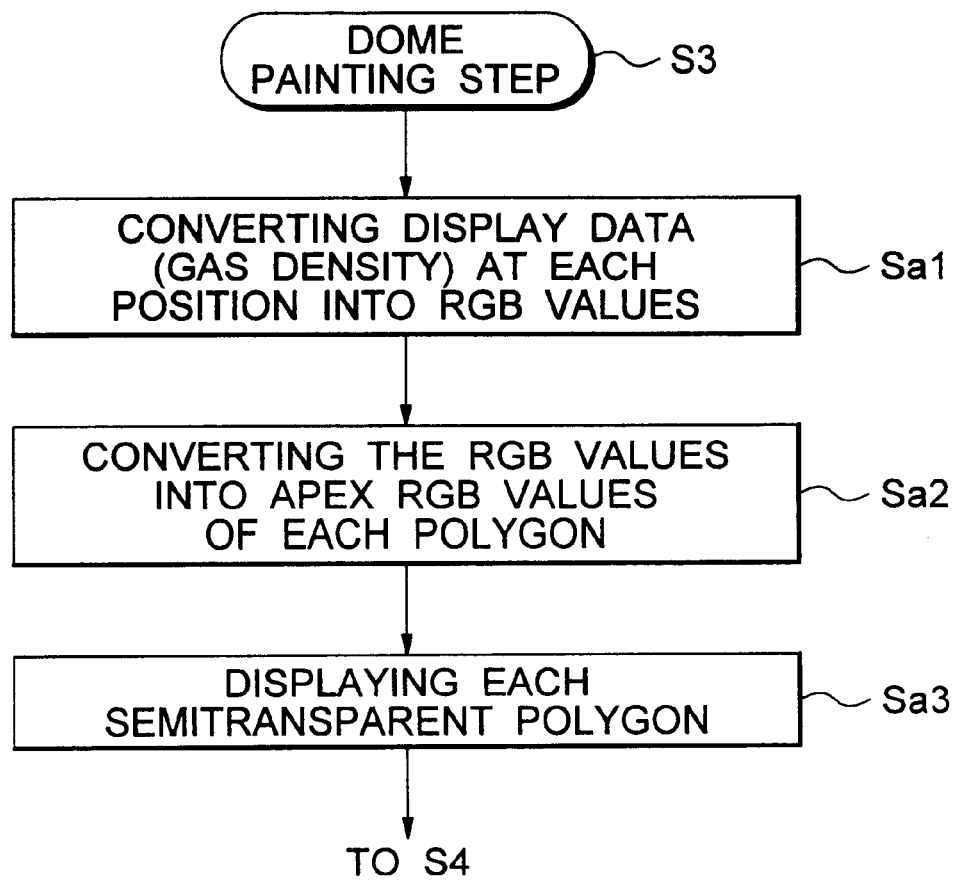
FIG. 7 shows a flow chart for use in describing the process of processing a polygon in conjunction with FIG. 6.

Referring to FIG. 7, the dome painting step S3 or S7 is described in detail. The next display data, such as the gas density or the gas amount, to be displayed at a next following time is calculated at each point on the pre-change table and is stored in the post-change table. The next display data is converted at a step Sa1 into RGB values which define flame colors on the post-change plane. The RGB values are converted at a step Sa2 into apex RGB values of each polygon which forms the dome. This shows that the RGB values on the flat plane illustrated in FIG. 2B are remapped on the dome shaped semispherical surface illustrated in FIG. 2A. Thereafter, processing is carried out at a step Sa3 to make each polygon semitransparent. The semitransparent polygon is displayed on the display device 65. At this step Sa3, each polygon has the apex RGB values, as mentioned before, and is painted by the use of the Gouraud Shading technique, as mentioned with reference to FIG. 3. Consequently, it is possible to display the flame with reality.

Figure 8A:
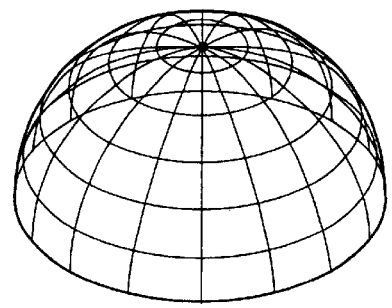
FIGS. 8A and 8B show a mapping process according to a second embodiment of this invention.
Figure 8B:
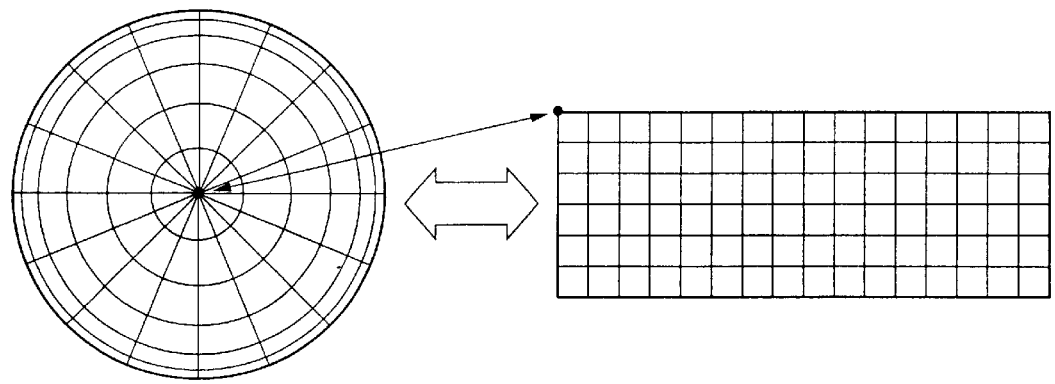

Referring to FIGS. 8A and 8B, an image display method according to a second embodiment maps the dome shaped semispherical surface (as shown on the left hand side of FIG. 8B) onto a flat surface which is shown on the right hand side of FIG. 8B and which is different from the flat surface illustrated in FIG. 2B. The dome shaped semispherical or curved surface illustrated on the left hand side of FIG. 8B is divided like the earth by longitudes and latitudes. In FIG. 8B, the dome shaped semispherical surface is mapped onto a flat plane of a rectangular shape, as shown on the right hand side of FIG. 8B, and the top point of the dome shaped semispherical surface is mapped at a leftmost and uppermost point of the rectangular flat plane. Even when the flow of the fluid, such as the inflammable fuel gas, is simulated by the use of this mapping technique, it is possible to obtain an excellent visual effect which is not less than that obtained by the mapping technique illustrated in FIG. 2.

More specifically, division of the dome shaped spherical surface illustrated in FIG. 8 is made such that a zone area which is close to the flow start point S is divided into narrow areas and the remaining zone remote from the flow start point S is divided into wide areas, as readily understood from FIG. 8B. Accordingly, gas spread close to the flow start point S can be finely and accurately expressed when the dome shaped spherical surface is divided into the above-mentioned manner. In general, each player's attention tends to be directed to the area close to the flow start point S. Therefore, an improved visual effect can be obtained with this method because the area to which the player's attention is directed is finely displayed.

Figure 9:
FIG. 9 shows an example of a display which uses the method according to this invention and which appears in an initial state.
Figure 10:
FIG. 10 shows a next display which appears after the initial state illustrated in FIG. 9.
Figure 11:
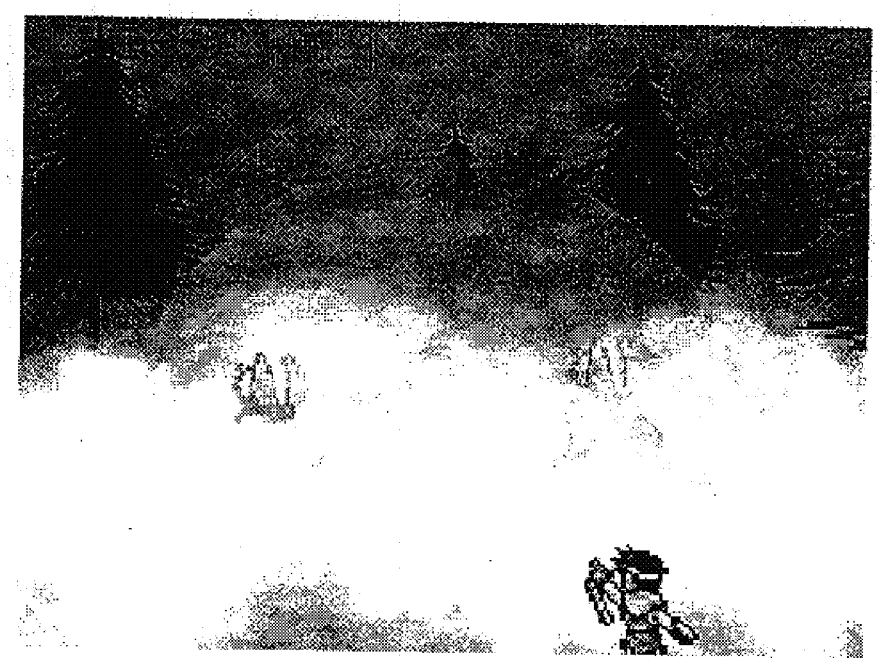
FIG. 11 shows another display that appears after the next display illustrated in FIG. 10.
Figure 12:
FIG. 12 shows a further display that appears after the display illustrated in FIG. 11.

Referring to FIGS. 9 to 12, illustration is made about a flame which is spread along a three-dimensional surface of a dome shape. Herein, it is to be noted that the dome shaped semispherical surface is assumed to be divided in the manner mentioned in conjunction with FIG. 8. As shown in FIG. 9, a semitransparent semispherical dome is displayed in a center region of a screen and an inflammable fuel fluid or gas is given at the top of the dome, as shown by a white thick line in FIG. 9. Under the circumstances, the inflammable fuel gas is burnt at the top of the dome. As shown in FIG. 10, only an area adjacent to the top of the dome is surrounded by a fire or a flame. Thereafter, when the inflammable fuel gas is expanded or spread at a middle part of the dome with lapse of time, the flame is also spread until the middle part of the dome, as illustrated in FIG. 11. As a result, a flame area is widened or expanded. With further lapse of time, the inflammable fuel gas is further caused to occur and reaches to the bottom of the dome. In this case, the whole of the dome is engulfed in the flame, as illustrated in FIG. 12.

As shown in FIGS. 9 to 12, it is possible with this method to display, with a high reality, the flame which engulfs the three-dimensional surface, such as the dome, and which is spreading along the surface.

While this invention has thus far been described in conjunction with a few embodiments thereof, it will readily be possible for those skilled in the art to put this invention into practice in various other manners. For example, the three-dimensional surface may not be the semispherical surface but a rectangular parallelepiped or the like. In addition, the three-dimensional surface may not have an invariable curvature and may be a curved surface having protrusions and recessed portions. Alternatively, the three-dimensional surface may have a curved surface defined by a normal curve. The configurations of the polygons which form the three-dimensional surface may have optional configurations. For example, an area which has a large curvature may be divided into a large number of polygons while another area having a small curvature may be divided into a small number of polygons. The fluid which is caused to flow along the three-dimensional surface may not be restricted to the inflammable fuel gas but may be molten metal. In addition, water, cloud, smoke, fog may be handled as the fluid because they are carried by a gas. Moreover, this invention is applicable to a liquid also. At any rate, an excellent visual effect can be achieved by a small amount of calculations to display the fluid which flows along the three-dimensional surface.

What is claimed is:

1. A method of simply and artificially displaying, on a display device, a fluid flowing from top to bottom along a three-dimensional surface which has a semispherical configuration, comprising the steps of:

mapping a fluid start point defined on top of the three-dimensional surface onto a predetermined flat surface to decide a provisional start point on the predetermined flat surface;

determining an initial fluid density at the provisional start point on the predetermined flat point;

deciding a succeeding fluid density after lapse of a unit time at each of the provisional start point and adjacent points which are spaced from the provisional start point by a unit distance in a plurality of prescribed directions, so that the succeeding fluid density at each of the provisional start point and the adjacent points is decreased in comparison with the initial fluid density at the provisional start point;

successively calculating a next following fluid density at each of the provisional start point and the adjacent points each time when a next unit time lapses, the next following fluid density being obtained by calculating not only a fluid caused to flow into each of the provisional start point and the adjacent points but also a fluid caused to flow returned back from the adjacent points to the provisional start point even when the provisional start point is defined on the top of the three-dimensional surface;

re-mapping each of the succeeding and the next following fluid densities of the predetermined flat surface onto the three-dimensional surface as re-mapped results; and successively displaying the re-mapped results on the display device.

2. A method as claimed in claim 1, wherein the fluid is an inflammable gas.

3. A method as claimed in claim 2, wherein each of the densities is concerned with a color of a flame to be displayed on the display device.

4. A method as claimed in claim 3, wherein the color of the flame becomes near to red as each density becomes low while the color of the flame becomes near to white as each density becomes high.

5. A method as claimed in claim 1, wherein the three-dimensional surface is a curved surface which is divided into a plurality of polygons each of which has apexes;

the provisional start point and each point of the predetermined flat surface being made to correspond to the apexes of the polygons.

6. A method as claimed in claim 5, wherein the mapped results are representative of colors of a flame which correspond to the densities at the apexes and a color inside each polygon is decided with reference to the colors at the apexes of each polygon.

7. A method as claimed in claim 5, wherein each polygon is subjected to processing so that it becomes semitransparent.

8. A method as claimed in claim 6, wherein each polygon has no texture to be attached.

9. An image display device for use in displaying, on a display device, an image such that a fluid flows from top to bottom along a three-dimensional surface of a semispherical configuration, comprising:

mapping means for mapping a fluid start point defined on top of the three-dimensional surface onto a predetermined flat surface to decide a provisional start point on the predetermined flat surface;

density calculating means for calculating an initial fluid density at the provisional start point on the predetermined flat point, together with a succeeding fluid density after lapse of a unit time at each of adjacent points which is spaced from the provisional start point by a unit distance in each of a plurality of prescribed directions, the succeeding fluid density being obtained by calculating not only a fluid caused to flow into each of the provisional start point and the adjacent points but also a fluid caused to flow returned back from the adjacent points to the provisional start point even when the provisional start point is defined on the top of the three-dimensional surface;

decreasing means for decreasing the succeeding fluid density at each of the adjacent positions and the provisional start point each time when a unit time lapses;

re-mapping means for re-mapping each of the densities on the predetermined flat surface onto the three-dimensional surface as re-mapped results; and successively displaying means for displaying the re-mapped results on the display device.

10. A computer-readable storage medium for storing a program which displays an image of a fluid flowing from top to bottom along a three-dimensional surface of a semispherical configuration, the program comprising the steps of:

mapping a fluid start point defined on top of the three-dimensional surface onto a predetermined flat surface to decide a provisional start point on the predetermined flat surface;

determining an initial fluid density at the provisional start point on the predetermined flat point;

deciding a succeeding fluid density after lapse of a unit time at each of the provisional start point and adjacent points which are spaced from the provisional start point by a unit distance in a plurality of prescribed directions, so that the succeeding fluid density at each of the provisional start point and the adjacent points is deceased in comparison with the initial fluid density at the provisional start point;

successively calculating a next following fluid density at each of the provisional start point and the adjacent points each time when a next unit time lapses, the next following fluid density being obtained by calculating not only a fluid caused to flow into each of the provisional start point and the adjacent points but also a fluid caused to flow returned back from the adjacent points to the provisional start point even when the provisional start point is defined on the top of the three-dimensional surface;

re-mapping each of the succeeding and the next following fluid densities of the predetermined flat surface onto the three-dimensional surface as re-mapped results; and successively displaying the re-mapped results on the display device.

11. A game device for use in executing a game by displaying, on a display device, a fluid which flows from top to bottom along a three-dimensional surface, comprising:

mapping means for mapping a fluid start point defined on top of the three-dimensional surface onto a predetermined flat surface to decide a provisional start point on the predetermined flat surface;

density calculating means for calculating an initial fluid density at the provisional start point on the predetermined flat point, together with a succeeding fluid density after lapse of a unit time at each of adjacent points which is spaced from the provisional start point by a unit distance in each of a plurality of prescribed directions, the succeeding fluid density being obtained by calculating not only a fluid caused to flow into each of the provisional start point and the adjacent points but also a fluid caused to flow returned back from the adjacent points to the provisional start point even when the provisional start point is defined on the top of the three-dimensional surface;

decreasing means for decreasing the succeeding fluid density at each of the adjacent positions and the provisional start point each time when a unit time lapses;

re-mapping means for re-mapping each of the densities on the predetermined flat surface onto the three-dimensional surface as re-mapped results; and successively displaying means for displaying the re-mapped results on the display device.

* * * * *